United States Patent
Kutcher (10) Patent No.: US 11,794,107 B2
(45) Date of Patent: Oct. 24, 2023

(54) SYSTEMS AND METHODS FOR IMPROVED COLLISION DETECTION IN VIDEO GAMES

(71) Applicant: Activision Publishing, Inc., Santa Monica, CA (US)

(72) Inventor: Benjamin Kutcher, Woodland Hills, CA (US)

(73) Assignee: Activision Publishing, Inc., Santa Monica, CA (US)

(*) Notice: Subject to any disclaimer, the term of this patent is extended or adjusted under 35 U.S.C. 154(b) by 0 days.

(21) Appl. No.: 17/645,845

(22) Filed: Dec. 23, 2021

(65) Prior Publication Data

US 2022/0203237 A1 Jun. 30, 2022

Related U.S. Application Data (60) Provisional application No. 63/131,958, filed on Dec. 30, 2020.

(51) Int. Cl.
*A63F 13/56* (2014.01)
*A63F 13/577* (2014.01)

(52) U.S. Cl.
CPC .................... *A63F 13/56* (2014.09)

(58) Field of Classification Search
CPC ........ A63F 13/56; A63F 13/57; A63F 13/573; A63F 13/58; A63F 13/50; A63F 13/52; A63F 2300/8017; A63F 2300/64; A63F 2300/643

See application file for complete search history.

(56) References Cited

U.S. PATENT DOCUMENTS

| | | |
|---|---|---|
| 5,530,796 A | 6/1996 | Wang |
| 5,561,736 A | 10/1996 | Moore |
| 5,563,946 A | 10/1996 | Cooper |
| 5,685,775 A | 11/1997 | Bakoglu |
| 5,706,507 A | 1/1998 | Schloss |
| 5,708,764 A | 1/1998 | Borrel |
| 5,736,985 A | 4/1998 | Lection |
| 5,737,416 A | 4/1998 | Cooper |
| 5,745,678 A | 4/1998 | Herzberg |

(Continued)

FOREIGN PATENT DOCUMENTS

| | | |
|---|---|---|
| AU | 768367 | 3/2004 |
| AU | 2005215048 | 10/2011 |

(Continued)

*Primary Examiner* — David L Lewis
*Assistant Examiner* — Matthew D Hoel
(74) *Attorney, Agent, or Firm* — Novel IP (57) ABSTRACT

The patent discloses improved methods and systems for detecting a collision between a player controlled virtual character in a video game and an object positioned on a surface in a virtual environment of the video game. Two geometric models are defined, one of which is preferably a cylinder and the other of which is preferably a capsule. For a frame of the video game, data indicative of a position, velocity and direction of the virtual character is acquired and, in a subsequent frame, data indicative of another position of the virtual character is acquired. The first geometric model is moved vertically downward by a predefined distance to identify a level of the ground surface and the second geometric model is moved horizontally forward to detect a collision of the virtual character with the object.

20 Claims, 6 Drawing Sheets

(56) References Cited

U.S. PATENT DOCUMENTS

| | | | | |
|---|---|---|---|---|
| 5,768,511 | A | 6/1998 | Galvin | |
| 5,825,877 | A | 10/1998 | Dan | |
| 5,835,692 | A | 11/1998 | Cragun | |
| 5,878,233 | A | 3/1999 | Schloss | |
| 5,883,628 | A | 3/1999 | Mullaly | |
| 5,900,879 | A | 5/1999 | Berry | |
| 5,903,266 | A | 5/1999 | Berstis | |
| 5,903,271 | A | 5/1999 | Bardon | |
| 5,911,045 | A | 6/1999 | Leyba | |
| 5,920,325 | A | 7/1999 | Morgan | |
| 5,923,324 | A | 7/1999 | Berry | |
| 5,963,209 | A * | 10/1999 | Hoppe | G06T 17/20 345/428 |
| 5,969,724 | A | 10/1999 | Berry | |
| 5,977,979 | A | 11/1999 | Clough | |
| 5,990,888 | A | 11/1999 | Blades | |
| 6,014,145 | A | 1/2000 | Bardon | |
| 6,025,839 | A | 2/2000 | Schell | |
| 6,059,842 | A | 5/2000 | Dumarot | |
| 6,064,354 | A * | 5/2000 | DeLuca | G09G 5/14 348/E13.058 |
| 6,069,632 | A | 5/2000 | Mullaly | |
| 6,081,270 | A | 6/2000 | Berry | |
| 6,081,271 | A | 6/2000 | Bardon | |
| 6,091,410 | A | 7/2000 | Lection | |
| 6,094,196 | A | 7/2000 | Berry | |
| 6,098,056 | A | 8/2000 | Rusnak | |
| 6,104,406 | A | 8/2000 | Berry | |
| 6,111,581 | A | 8/2000 | Berry | |
| 6,134,588 | A | 10/2000 | Guenthner | |
| 6,144,381 | A | 11/2000 | Lection | |
| 6,148,328 | A | 11/2000 | Cuomo | |
| 6,185,614 | B1 | 2/2001 | Cuomo | |
| 6,201,881 | B1 | 3/2001 | Masuda | |
| 6,222,551 | B1 | 4/2001 | Schneider | |
| 6,266,064 | B1 * | 7/2001 | Snyder | G06T 15/06 345/953 |
| 6,271,842 | B1 | 8/2001 | Bardon | |
| 6,271,843 | B1 | 8/2001 | Lection | |
| 6,282,547 | B1 | 8/2001 | Hirsch | |
| 6,311,206 | B1 | 10/2001 | Malkin | |
| 6,334,141 | B1 | 12/2001 | Varma | |
| 6,336,134 | B1 | 1/2002 | Varma | |
| 6,337,700 | B1 | 1/2002 | Kinoe | |
| 6,353,449 | B1 | 3/2002 | Gregg | |
| 6,356,297 | B1 | 3/2002 | Cheng | |
| 6,407,748 | B1 * | 6/2002 | Xavier | G06T 19/20 345/672 |
| 6,411,312 | B1 | 6/2002 | Sheppard | |
| 6,426,757 | B1 | 7/2002 | Smith | |
| 6,445,389 | B1 | 9/2002 | Bossen | |
| 6,452,593 | B1 | 9/2002 | Challener | |
| 6,462,760 | B1 | 10/2002 | Cox, Jr. | |
| 6,469,712 | B1 | 10/2002 | Hilpert, Jr. | |
| 6,473,085 | B1 | 10/2002 | Brock | |
| 6,499,053 | B1 | 12/2002 | Marquette | |
| 6,505,208 | B1 | 1/2003 | Kanevsky | |
| 6,525,731 | B1 | 2/2003 | Suits | |
| 6,549,933 | B1 | 4/2003 | Barrett | |
| 6,567,109 | B1 | 5/2003 | Todd | |
| 6,618,751 | B1 | 9/2003 | Challenger | |
| RE38,375 | E | 12/2003 | Herzberg | |
| 6,657,617 | B2 | 12/2003 | Paolini | |
| 6,657,642 | B1 | 12/2003 | Bardon | |
| 6,684,255 | B1 | 1/2004 | Martin | |
| 6,708,142 | B1 * | 3/2004 | Baillot | G06T 17/00 703/2 |
| 6,717,600 | B2 | 4/2004 | Dutta | |
| 6,734,884 | B1 | 5/2004 | Berry | |
| 6,765,596 | B2 | 7/2004 | Lection | |
| 6,768,486 | B1 * | 7/2004 | Szabo | G06T 19/20 345/643 |
| 6,781,607 | B1 | 8/2004 | Benham | |
| 6,819,669 | B2 | 11/2004 | Rooney | |
| 6,832,239 | B1 | 12/2004 | Kraft | |
| 6,836,480 | B2 | 12/2004 | Basso | |
| 6,886,026 | B1 | 4/2005 | Hanson | |
| 6,948,168 | B1 | 9/2005 | Kuprionas | |
| RE38,865 | E | 11/2005 | Dumarot | |
| 6,993,596 | B2 | 1/2006 | Hinton | |
| 7,028,296 | B2 | 4/2006 | Irfan | |
| 7,062,533 | B2 | 6/2006 | Brown | |
| 7,143,409 | B2 | 11/2006 | Herrero | |
| 7,170,492 | B2 * | 1/2007 | Bell | G06F 3/0304 345/157 |
| 7,209,137 | B2 | 4/2007 | Brokenshire | |
| 7,230,616 | B2 | 6/2007 | Taubin | |
| 7,239,718 | B2 * | 7/2007 | Park | G06T 7/251 345/604 |
| 7,249,123 | B2 | 7/2007 | Elder | |
| 7,263,511 | B2 | 8/2007 | Bodin | |
| 7,287,053 | B2 | 10/2007 | Bodin | |
| 7,296,007 | B1 * | 11/2007 | Funge | G06N 20/00 434/350 |
| 7,305,438 | B2 | 12/2007 | Christensen | |
| 7,308,476 | B2 | 12/2007 | Mannaru | |
| 7,404,149 | B2 | 7/2008 | Fox | |
| 7,426,538 | B2 | 9/2008 | Bodin | |
| 7,427,980 | B1 | 9/2008 | Partridge | |
| 7,428,588 | B2 | 9/2008 | Berstis | |
| 7,429,987 | B2 | 9/2008 | Leah | |
| 7,436,407 | B2 | 10/2008 | Doi | |
| 7,439,975 | B2 | 10/2008 | Hsu | |
| 7,443,393 | B2 | 10/2008 | Shen | |
| 7,447,996 | B1 | 11/2008 | Cox | |
| 7,467,181 | B2 | 12/2008 | McGowan | |
| 7,475,354 | B2 | 1/2009 | Guido | |
| 7,478,127 | B2 | 1/2009 | Creamer | |
| 7,484,012 | B2 | 1/2009 | Hinton | |
| 7,489,308 | B2 * | 2/2009 | Blake | G06F 3/043 345/173 |
| 7,503,007 | B2 | 3/2009 | Goodman | |
| 7,506,264 | B2 | 3/2009 | Polan | |
| 7,515,136 | B1 | 4/2009 | Kanevsky | |
| 7,525,964 | B2 | 4/2009 | Astley | |
| 7,552,177 | B2 | 6/2009 | Kessen | |
| 7,565,650 | B2 | 7/2009 | Bhogal | |
| 7,571,224 | B2 | 8/2009 | Childress | |
| 7,571,389 | B2 | 8/2009 | Broussard | |
| 7,580,888 | B2 | 8/2009 | Ur | |
| 7,596,596 | B2 | 9/2009 | Chen | |
| 7,640,587 | B2 | 12/2009 | Fox | |
| 7,667,701 | B2 | 2/2010 | Leah | |
| 7,698,656 | B2 | 4/2010 | Srivastava | |
| 7,702,784 | B2 | 4/2010 | Berstis | |
| 7,714,867 | B2 | 5/2010 | Doi | |
| 7,719,532 | B2 | 5/2010 | Schardt | |
| 7,719,535 | B2 | 5/2010 | Tadokoro | |
| 7,734,691 | B2 | 6/2010 | Creamer | |
| 7,737,969 | B2 | 6/2010 | Shen | |
| 7,743,095 | B2 | 6/2010 | Goldberg | |
| 7,747,679 | B2 | 6/2010 | Galvin | |
| 7,765,478 | B2 | 7/2010 | Reed | |
| 7,768,514 | B2 | 8/2010 | Pagan | |
| 7,773,087 | B2 | 8/2010 | Fowler | |
| 7,774,407 | B2 | 8/2010 | Daly | |
| 7,782,318 | B2 | 8/2010 | Shearer | |
| 7,792,263 | B2 | 9/2010 | Bruce | |
| 7,792,801 | B2 | 9/2010 | Hamilton, II | |
| 7,796,128 | B2 | 9/2010 | Radzikowski | |
| 7,808,500 | B2 | 10/2010 | Shearer | |
| 7,814,152 | B2 | 10/2010 | McGowan | |
| 7,827,318 | B2 | 11/2010 | Hinton | |
| 7,843,471 | B2 | 11/2010 | Doan | |
| 7,844,663 | B2 | 11/2010 | Boutboul | |
| 7,847,799 | B2 | 12/2010 | Taubin | |
| 7,856,469 | B2 | 12/2010 | Chen | |
| 7,873,485 | B2 | 1/2011 | Castelli | |
| 7,882,222 | B2 | 2/2011 | Dolbier | |
| 7,882,243 | B2 | 2/2011 | Ivory | |
| 7,884,819 | B2 | 2/2011 | Kuesel | |
| 7,886,045 | B2 | 2/2011 | Bates | |
| 7,890,623 | B2 | 2/2011 | Bates | |

(56) References Cited

U.S. PATENT DOCUMENTS

| | | |
|---|---|---|
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | George |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | Mcvey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,243,064 B1* | 8/2012 | Moravanszky ......... G06F 30/20 345/473 |
| 8,245,241 B2 | 8/2012 | Hamilton, II |
| 8,245,283 B2 | 8/2012 | Dawson |
| 8,259,109 B2* | 9/2012 | El Dokor ................ A63F 13/79 345/181 |
| 8,265,253 B2 | 9/2012 | Bruce |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,395,620 B2* | 3/2013 | El Dokor ................ G06F 3/011 345/181 |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,923,584 B2* | 12/2014 | Chabanas ............ G06T 7/0012 128/923 |
| 8,979,652 B1* | 3/2015 | Ciszewski ............ A63F 13/577 463/32 |
| 8,992,316 B2 | 3/2015 | Smith |
| 9,076,212 B2* | 7/2015 | Ernst ....................... H04N 7/18 |
| 9,083,654 B2 | 7/2015 | Dawson |
| 9,152,914 B2 | 10/2015 | Haggar |
| 9,205,328 B2 | 12/2015 | Bansi |
| 9,269,152 B1* | 2/2016 | Worley, III ............. G06F 3/011 |
| 9,286,731 B2 | 3/2016 | Hamilton, II |
| 9,299,080 B2 | 3/2016 | Dawson |
| 9,305,365 B2* | 4/2016 | Lovberg ................. G06T 7/248 |
| 9,364,746 B2 | 6/2016 | Chudley |
| 9,483,847 B2* | 11/2016 | Piché ..................... G06T 11/001 |
| 9,501,866 B2* | 11/2016 | Piché ..................... G06T 15/04 |
| 9,525,746 B2 | 12/2016 | Bates |
| 9,583,109 B2 | 2/2017 | Kurata |
| 9,606,209 B2* | 3/2017 | Ernst ................ G01R 33/56509 |
| 9,682,324 B2 | 6/2017 | Bansi |
| 9,694,283 B2* | 7/2017 | El Dokor .............. A63F 13/22 |
| 9,717,461 B2* | 8/2017 | Yu ........................ G01R 33/283 |
| 9,734,589 B2* | 8/2017 | Yu ........................... G06T 7/248 |
| 9,764,244 B2 | 9/2017 | Bansi |
| 9,782,141 B2* | 10/2017 | Yu ........................... G06T 7/207 |
| 9,789,406 B2 | 10/2017 | Marr |
| 9,808,722 B2 | 11/2017 | Kawachiya |
| 9,943,247 B2* | 4/2018 | Ernst .................... G06V 10/806 |
| 9,972,104 B2* | 5/2018 | Rowell .................. G06T 13/00 |
| 10,004,462 B2* | 6/2018 | Ernst .................... G06T 7/292 |
| 10,089,782 B2* | 10/2018 | Plowman .............. G06T 15/80 |
| 10,327,708 B2* | 6/2019 | Yu ........................ A61B 5/1127 |

(56) References Cited

U.S. PATENT DOCUMENTS

| | | | |
|---|---|---|---|
| 10,331,819 B2* | 6/2019 | Park | G06F 30/20 |
| 10,447,997 B2* | 10/2019 | Sung | G01S 17/86 |
| 10,515,479 B2* | 12/2019 | Piya | G06T 19/20 |
| 10,600,225 B2* | 3/2020 | Grossman | G06T 13/80 |
| 10,716,515 B2 | 7/2020 | Gustafsson | A61B 5/1127 |
| 10,981,059 B2* | 4/2021 | Cerny | G06T 1/60 |
| 11,273,367 B1* | 3/2022 | Beckett | G06F 3/0346 |
| 11,301,954 B2* | 4/2022 | Kuang | G06T 3/20 |
| 11,471,769 B2* | 10/2022 | Kawamura | A63F 13/426 |
| 2002/0019257 A1* | 2/2002 | Koizumi | A63F 13/45 |
| | | | 463/32 |
| 2002/0024521 A1* | 2/2002 | Goden | A63F 13/52 |
| | | | 345/474 |
| 2002/0161562 A1* | 10/2002 | Strunk | G06T 13/20 |
| | | | 703/6 |
| 2003/0164846 A1* | 9/2003 | Ottesen | G06F 16/40 |
| | | | 715/723 |
| 2005/0165873 A1* | 7/2005 | Zhang | G06F 17/11 |
| | | | 708/446 |
| 2006/0149516 A1* | 7/2006 | Bond | G06F 30/20 |
| | | | 703/6 |
| 2006/0200327 A1* | 9/2006 | Bordes | A63F 13/45 |
| | | | 703/6 |
| 2006/0221072 A1* | 10/2006 | Se | G06T 17/00 |
| | | | 345/420 |
| 2006/0262114 A1* | 11/2006 | Leprevost | G06T 13/20 |
| | | | 345/419 |
| 2008/0267449 A1* | 10/2008 | Dumas | G06T 17/00 |
| | | | 382/103 |
| 2009/0104990 A1* | 4/2009 | Tsujino | A63F 13/5375 |
| | | | 463/32 |
| 2009/0113448 A1 | 4/2009 | Smith | |
| 2010/0298048 A1* | 11/2010 | Yamazaki | A63F 13/10 |
| | | | 463/30 |
| 2011/0165939 A1* | 7/2011 | Borst | A63F 13/63 |
| | | | 463/29 |
| 2011/0295576 A1* | 12/2011 | Miyata | B25J 9/1676 |
| | | | 703/2 |
| 2012/0115596 A1* | 5/2012 | Otani | A63F 13/422 |
| | | | 463/30 |
| 2012/0194422 A1* | 8/2012 | El Dokor | G06F 3/011 |
| | | | 463/36 |
| 2012/0293412 A1* | 11/2012 | El Dokor | A63F 13/213 |
| | | | 345/158 |
| 2012/0303343 A1* | 11/2012 | Sugiyama | G06N 3/006 |
| | | | 703/6 |
| 2014/0025203 A1* | 1/2014 | Inazumi | B25J 9/1666 |
| | | | 700/255 |
| 2014/0344725 A1 | 11/2014 | Bates | |
| 2016/0191671 A1 | 6/2016 | Dawson | |
| 2018/0040101 A1* | 2/2018 | Kuang | G06T 7/246 |
| 2019/0251657 A1* | 8/2019 | Kuang | G06T 7/60 |
| 2023/0021861 A1* | 1/2023 | Fujiwara | G06F 3/013 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

\* cited by examiner

SYSTEMS AND METHODS FOR IMPROVED COLLISION DETECTION IN VIDEO GAMES

CROSS-REFERENCE

The present application relies on, for priority, U.S. Patent Provisional Application No. 63/131,958, titled "Systems and Methods for Improved Collision Detection in Video Games" and filed on Dec. 30, 2020. The above-referenced application is herein incorporated by reference in its entirety.

FIELD

The present specification is related generally to the field of video games and modeling interactions between visible bodies in a virtual environment. More specifically the present specification is related to efficiently simulating collision detection between rigid, visible bodies in the virtual environment.

BACKGROUND

Collision detection is a vital part of numerous video games. Without collision detection functionality, the physical interaction between various bodies cannot be detected and, therefore, cannot be resolved. However, in order to be able to simulate collision between interacting rigid bodies, the efficiency of the collision detection is crucial.

Various optimization strategies have been proposed in order to speed up collision detection. Typically, a collision detection phase is differentiated into a rough or coarse collision detection phase, the objective of which is to quickly reject all pairs of bodies that are not in contact, and a fine collision detection phase that efficiently calculates contact points between pairs of potentially colliding bodies. Thus, if calculations in the rough or coarse collision detection phase predict a collision of two bodies, one or more contact points have to be computed. A contact point has to be calculated if the distance between two potentially colliding bodies is smaller than a predefined value.

One general approach to simplify collision detection is the use of geometric primitives, whose geometry is known exactly and can therefore be exploited more easily. A geometric primitive defines a body by a few parameters. For instance a cylinder is characterized by its global position, radius, length and orientation. With these data the cylinder is presented exactly. Accordingly, in a conventional sweep cast operation for collision detection, a geometric shape, such as a cylinder, bounds the entirety of a moving avatar and is moved in a predefined direction to identify points of collision with structures, such as the ground or obstacles. Typically, in the course of a given frame, the geometric shape is integrated over a distance and, if a collision with a surface is detected, the sweep cast operation is readjusted such that the geometric shape is swept in a different direction.

For example, in one approach, a cylindrical shape bounding a player controlled avatar is first moved downward to identify a ground level. Once done (and a ground level is identified), a plane relative to that ground level is determined (through a standard offset, for example) and the geometric shape is swept across that horizontal plane until a collision is identified. Focusing on small ground obstacles, if the geometric shape encounters such an obstacle, the sweep is halted from continuing in the same direction and, as described above, redirected.

In a situation where there are numerous ground obstacles, this could require many up, side, down sweep casts per frame, however, resulting in far greater processing time. Additionally, a cylinder is difficult to handle because there are edges at the end caps (also referred to as discs). If the cylinder collides with another cylinder or a box, inevitable edge-edge collisions can occur. Another reason why the cylinder is hard to handle is that it can be resource intensive to know where to create the contact point(s) in many collision cases. For example, if two cylinders collide, parallel heuristics need to be implemented to decide where the motion was prior to collision. That may lead to wrongly placed contact point(s) and end up with incorrect results.

Accordingly, there is a need for systems and methods that enable computationally efficient determination of collision between a player controlled avatar or virtual character and one or more obstacles positioned on a ground in a virtual environment. There is also a need to ensure that collision detection with numerous small ground objects does not lead to too many up, side, or down sweep casts per frame.

SUMMARY

The following embodiments and aspects thereof are described and illustrated in conjunction with systems, tools and methods, which are meant to be exemplary and illustrative, not limiting in scope. The present application discloses numerous embodiments.

In some embodiments, the present specification discloses a method of detecting a collision between a player controlled virtual character and an object positioned in a virtual environment of a video game, the method being implemented by at least one server executing a plurality of programmatic instructions and comprising: defining a first geometric model and a second geometric model, wherein the first geometric model has a first shape and first size, wherein the second geometric model has a second shape and second size, wherein each of the first geometric model and the second geometric model at least partially bound the virtual character, and wherein the first geometric model fully encompasses the second geometric model; acquiring, for a first frame of the video game, first data indicative of player input associated with a movement of the virtual character, wherein the first data includes a first position, a first velocity and a first direction of the virtual character and wherein the first velocity is relative to the object; determining, for a second frame of the video game, second data indicative of a second position of the virtual character, wherein the second position is different from the first position; moving, the first geometric model, vertically downward from a third position to a fourth position by a predefined first distance in order to identify a level of a ground surface in the virtual environment; and moving, the second geometric model, horizontally forward from the first position to the second position in order to detect the collision of the virtual character with the object.

Optionally, the first shape is that of a cylinder and the first size is characterized by a first center line containing a center of mass of the cylinder and a first radius, and the second shape is that of a capsule and the second size is characterized by a second center line containing a center of mass of the capsule and a second radius.

Optionally, the second position is determined by predicting a path of the virtual character from the first position to the second position based on the first direction and first velocity.

Optionally, the predefined first distance is a sum of a radius of the second geometric model, a height of a cap of the second geometric model above the ground surface and a customizable second distance.

Optionally, the second geometric model is moved such that a bottom cap of the second geometric model remains at a predefined height above the ground surface.

Optionally, the level may be horizontal or sloping.

Optionally, the horizontal forward movement of the second geometric model detects collision with the object if the object has a height greater than a predefined height above the ground surface.

Optionally, the method further comprises determining an adjusted position, direction and/or velocity of the virtual character if a collision is detected.

Optionally, the method further comprises moving the virtual character to the second position if no collision is detected.

Optionally, an outer surface of the object is represented by a mesh in an exact shape of the object.

Optionally, the object is represented by a three dimensional geometric shape bounding the object.

Optionally, the collision detection is performed periodically at a rate equal to a frame rate of display of the virtual environment.

In some embodiments, the present specification also discloses a computer readable non-transitory medium comprising a plurality of executable programmatic instructions wherein, when said plurality of executable programmatic instructions are executed by a processor in a computing device, a process for detecting collision between a player controlled virtual character and an object positioned on a ground in a virtual environment is performed, the plurality of executable programmatic instructions being implemented by at least one server and comprising: defining first and second geometric models, wherein the first geometric model has a first shape and first size while the second geometric model has a second shape and second size, wherein the first and second geometric models at least partially bound the virtual character, and wherein the first geometric model fully bounds the second geometric model; acquiring, for a frame, first data indicative of player input associated with manipulation of the virtual character, wherein the first data includes a first position, first velocity and first direction of the virtual character, and wherein the first velocity is relative to the object; determining, for a next frame, second data indicative of a second position of the virtual character; moving, the first geometric model, vertically downward from a third position to a fourth position by a predefined first distance in order to identify a level of the ground; and moving, the second geometric model, horizontally forward from the first position to the second position in order to detect collision of the virtual character with the object.

Optionally, the first shape is that of a cylinder and the first size is characterized by a first center line containing a center of mass of the cylinder and a first radius, and the second shape is that of a capsule and the second size is characterized by a second center line containing a center of mass of the capsule and a second radius.

Optionally, the second position is determined by predicting a path of the virtual character from the first position to the second position based on the first direction and first velocity.

Optionally, the predefined first distance is a sum of a radius of the second geometric model, a height of a cap of the second geometric model above the ground and a customizable second distance.

Optionally, the second geometric model is moved such that a bottom cap of the second geometric model remains at a predefined height above the ground.

Optionally, the level may be horizontal or sloping.

Optionally, the horizontal forward movement of the second geometric model detects collision with the object if the object has a height greater than a predefined height above the ground.

Optionally, the computer readable non-transitory medium further comprises instructions for determining an adjusted position, direction and/or velocity of the virtual character if a collision is detected.

Optionally, the computer readable non-transitory medium further comprises instructions for moving the virtual character to the second position if no collision is detected.

Optionally, an outer surface of the object is represented by a mesh in an exact shape of the object.

Optionally, the object is represented by a three dimensional geometric shape bounding the object.

Optionally, the collision detection is performed periodically at a rate equal to a frame rate of display of the virtual environment.

In some embodiments, the present specification also discloses a computer readable non-transitory medium comprising a plurality of executable programmatic instructions wherein, when said plurality of executable programmatic instructions are executed by a processor in a computing device, a process for performing collision detection between a virtual character controlled by a player and an object positioned on a ground in a virtual environment is performed, the plurality of executable programmatic instructions being implemented by at least one server and comprising: programmatic instructions, stored in said computer readable non-transitory medium, for defining a cylinder model and a capsule model, wherein the cylinder model has a first size and the capsule model has a second size, wherein the cylinder and capsule models at least partially bound the virtual character, and wherein the cylinder model fully bounds the capsule model; programmatic instructions, stored in said computer readable non-transitory medium, for acquiring, for a frame, first data indicative of player input associated with maneuvering of the virtual character, wherein the first data includes a first position, first velocity and first direction of the virtual character, and wherein the first velocity is relative to the object; programmatic instructions, stored in said computer readable non-transitory medium, for determining, for a next frame, second data indicative of a second position of the virtual character; programmatic instructions, stored in said computer readable non-transitory medium, for moving, the cylinder model, vertically downward from a third position to a fourth position by a predefined first distance in order to identify a level of the ground; and programmatic instructions, stored in said computer readable non-transitory medium, for moving, the capsule model, horizontally forward from the first position to the second position in order to detect collision of the virtual character with the object.

Optionally, the first size is characterized by a first center line containing a center of mass of the cylinder and a first radius, and the second size is characterized by a second center line containing a center of mass of the capsule and a second radius.

Optionally, the second position is determined by predicting a path of the virtual character from the first position to the second position based on the first direction and first velocity.

Optionally, the predefined first distance is a sum of a radius of the capsule model, a height of a cap of the capsule model above the ground and a customizable second distance.

Optionally, the capsule model is moved such that a bottom cap of the second geometric model remains at a predefined height above the level of the ground.

Optionally, the level is either horizontal or sloping.

Optionally, the horizontal forward movement of the capsule model detects collision with the object if the object has a height greater than a predefined height above the ground.

Optionally, the computer readable non-transitory medium further comprises instructions for determining an adjusted position, direction and/or velocity of the virtual character if a collision is detected.

Optionally, the computer readable non-transitory medium further comprises instructions for moving the virtual character to the second position if no collision is detected.

Optionally, an outer surface of the object is represented by a mesh in an exact shape of the object.

Optionally, the object is represented by a three dimensional geometric shape bounding the object.

Optionally, the collision detection is performed periodically at a rate equal to a frame rate of display of the virtual environment.

The aforementioned and other embodiments of the present specification shall be described in greater depth in the drawings and detailed description provided below.

BRIEF DESCRIPTION OF THE DRAWINGS

These and other features and advantages of the present specification will be appreciated, as they become better understood by reference to the following detailed description when considered in connection with the accompanying drawings, wherein.

DETAILED DESCRIPTION

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The term "a multi-player online gaming environment" or "massively multiplayer online game" may be construed to mean a specific hardware architecture in which one or more servers electronically communicate with, and concurrently support game interactions with, a plurality of client devices, thereby enabling each of the client devices to simultaneously play in the same instance of the same game. Preferably the plurality of client devices number in the dozens, preferably hundreds, preferably thousands. In one embodiment, the number of concurrently supported client devices ranges from 10 to 5,000,000 and every whole number increment or range therein. Accordingly, a multi-player gaming environment or massively multi-player online game is a computer-related technology, a non-generic technological environment, and should not be abstractly considered a generic method of organizing human activity divorced from its specific technology environment.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code enable or cause the CPU of the computing device to perform various functions and processes. In alternate embodiments, hard-wired circuitry may be used in place of, or in combination with, software instructions for implementation of the processes of systems and methods described in this application. Thus, the systems and methods described are not limited to any specific combination of hardware and software.

The term "module", "application" or "engine" used in this disclosure may refer to computer logic utilized to provide a desired functionality, service or operation by programming or controlling a general purpose processor. Stated differently, in some embodiments, a module, application or engine implements a plurality of instructions or programmatic code to cause a general purpose processor to perform one or more functions. In various embodiments, a module, application or engine can be implemented in hardware, firmware, software or any combination thereof. The module, application or engine may be interchangeably used with unit, logic, logical block, component, or circuit, for example. The module, application or engine may be the minimum unit, or part thereof, which performs one or more particular functions.

The term "swept volume" used in this disclosure may refer to a virtual volume generated by sweeping a solid or a collection of surfaces in game space along a path or trajectory.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise.

Gaming Environment

Figure 1A:
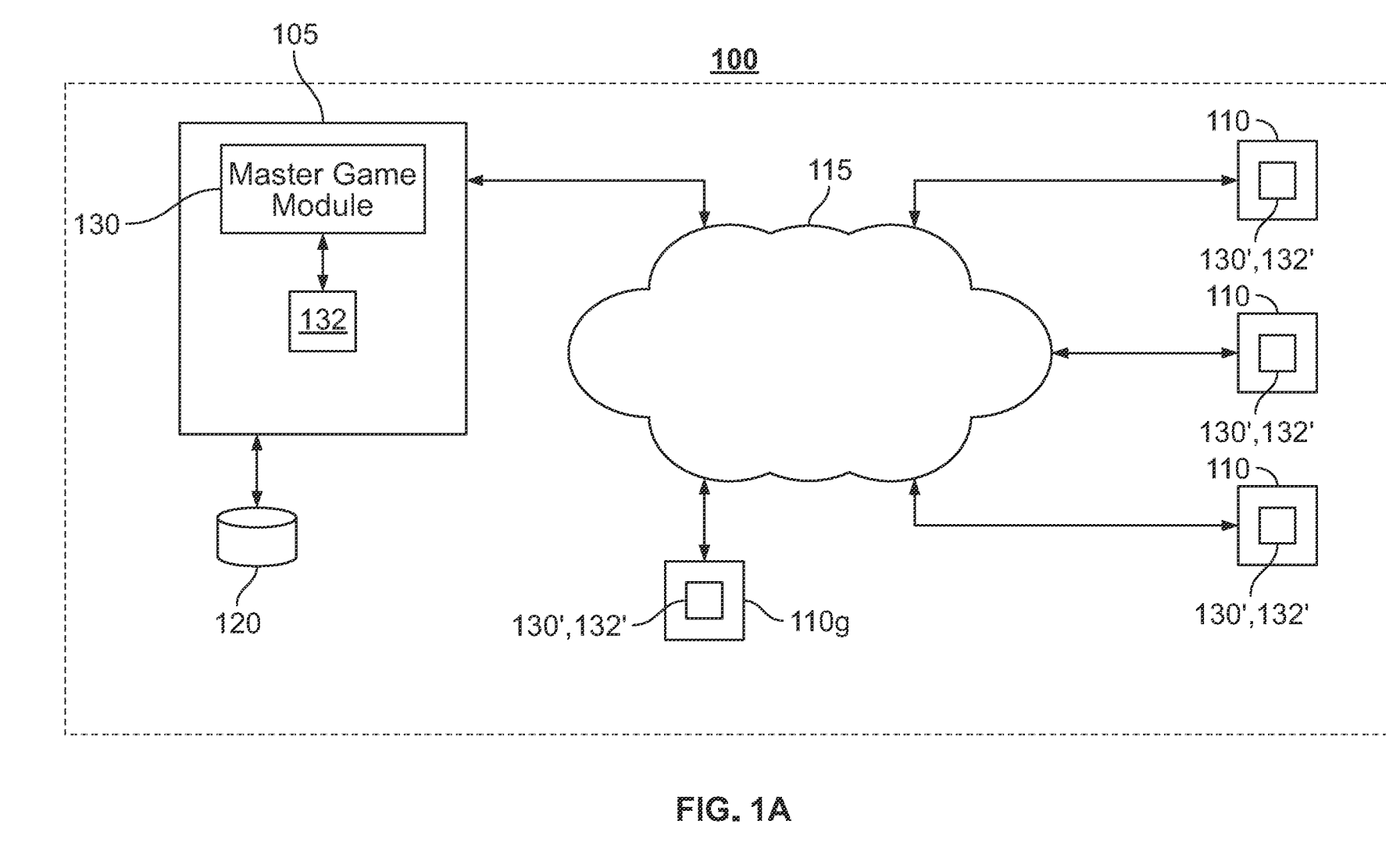
FIG. 1A is a block diagram illustration of a multi-player online gaming system or environment, in accordance with some embodiments of the present specification.

FIG. 1A illustrates an embodiment of a multi-player online gaming or massively multiplayer online gaming system/environment 100 in which the systems and methods of the present specification may be implemented or executed. The system 100 comprises client-server architecture, where one or more game servers 105 are in communication with one or more client devices 110 over a network 115. Players and non-players, such as computer graphics artists or designers, may access the system 100 via the one or more client devices 110. The client devices 110 comprise computing devices such as, but not limited to, personal or desktop computers, laptops, Netbooks, handheld devices such as smartphones, tablets, and PDAs, gaming consoles and/or any other computing platform known to persons of ordinary skill in the art. Although four client devices 110 are illustrated in FIG. 1A, any number of client devices 110 can be in communication with the one or more game servers 105 over the network 115.

The one or more game servers 105 can be any computing device having one or more processors and one or more computer-readable storage media such as RAM, hard disk or any other optical or magnetic media. The one or more game servers 105 include a plurality of modules operating to provide or implement a plurality of functional, operational or service-oriented methods of the present specification. In some embodiments, the one or more game servers 105 include or are in communication with at least one database system 120. The database system 120 stores a plurality of game data associated with at least one game that is served or provided to the client devices 110 over the network 115. In some embodiments, the one or more game servers 105 may be implemented by a cloud of computing platforms operating together as game servers 105.

In accordance with aspects of the present specification, the one or more game servers 105 provide or implement a plurality of modules or engines such as, but not limited to, a master game module 130 and a collision detection simulation module 132. The one or more client devices 110 are configured to implement or execute one or more of a plurality of client-side modules some of which are same as or similar to the modules of the one or more game servers 105. In some embodiments each of the player and non-player client devices 110 executes a client-side game module 130' (also referred to as—client game module 130') that may further integrate a client-side collision detection simulation module 132'. In some embodiments, however, the client-side collision detection simulation module 132' may not be required and all simulation processes related to the collision detection functionality may be implemented at the one or more game servers 105.

In some embodiments, the at least one non-player client device 110g is used by a computer graphics artist or designer to log into the one or more game servers 105 (via the client game module 130') and execute the module 132 on the server to generate one or more GUIs that enable the computer graphics artist or designer to customize and set one or more parameters, attributes or characteristics related to a composite model defined to represent a player controlled avatar or virtual character.

While various aspects of the present specification are being described with reference to functionalities or programming distributed across modules or engines 130 and 132, it should be appreciated that, in some embodiments, some or all of the functionalities or programming associated with these modules or engines may be integrated within fewer modules or in a single module—such as, for example, in the master game module 130 itself on the server side.

In embodiments, the master game module 130 is configured to execute an instance of an online game to facilitate interaction of the players with the game. In embodiments, the instance of the game executed may be synchronous, asynchronous, and/or semi-synchronous. The master game module 130 controls aspects of the game for all players and receives and processes each player's input in the game. In other words, the master game module 130 hosts the online game for all players, receives game data from the client devices 110 and transmits updates to all client devices 110 based on the received game data so that the game, on each of the client devices 110, represents the most updated or current status with reference to interactions of all players with the game. Thus, the master game module 130 transmits game data over the network 115 to the client devices 110 for use and rendering by the game module 130' to provide local versions and current status of the game to the players.

On the client-side, each of the one or more player client devices 110 implements the game module 130' that operates as a gaming application to provide a player with an interface between the player and the game. The game module 130' generates the interface to render a virtual environment, virtual space, game space, map or virtual world associated with the game and enables the player to interact in the virtual environment to perform a plurality of game and other tasks and objectives. The game module 130' accesses at least a portion of game data, received from the game server 105, to provide an accurate representation of the game to the player. The game module 130' captures and processes player inputs and interactions within the virtual world or environment and provides at least a portion as updates to the game server 110 over the network 115.

The database system 120 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database system 120 may comprise one or more such databases that reside in one or more physical devices and in one or more physical locations.

Figure 1B:
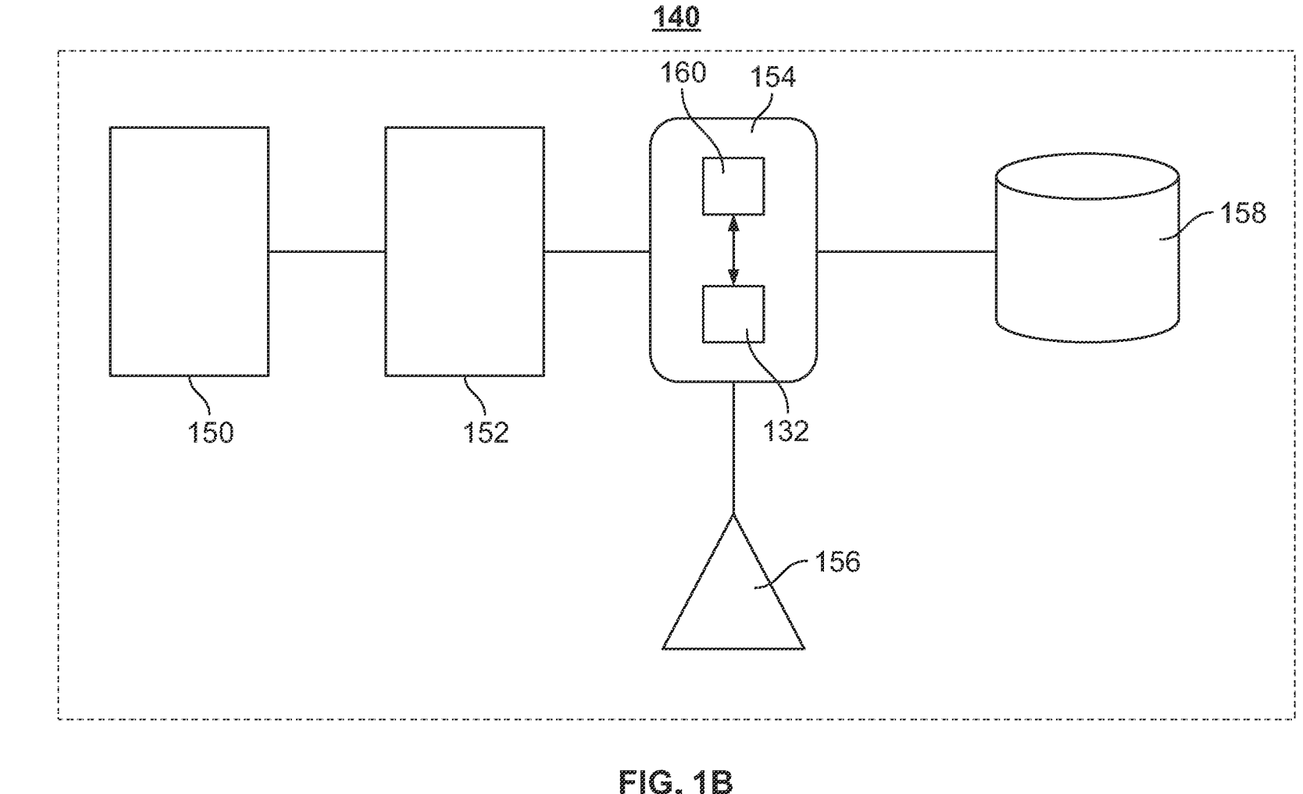
FIG. 1B is a block diagram illustration of an offline gaming system or environment, in accordance with some embodiments of the present specification.

While the embodiments of the present specification will be illustrated with reference to the multi-player online gaming or massively multiplayer online gaming system/environment 100 of FIG. 1A, the embodiments are equally applicable to offline gaming environments such as the system/environment 140 of FIG. 1B. As shown in FIG. 1B, the system 140 includes a display 150, graphics hardware 152, a computing platform 154, a user interface 156 and a storage device or memory 158. The computing platform 154 may include a number of components for processing data, rendering the game space or virtual environment and detecting collision, such as a graphics system 160 and the collision detection simulation module 132.

The graphics system 160 may perform rendering operations based on the results of the simulation operations performed by the collision detection simulation module 132. The rendering operations, performed by graphics system 160, may include visibility, culling and tessellation operations, for example. Based on results of the rendering operations, commands (such as Open GL commands) may be issued by graphics system 160 to the graphics hardware 152 to cause a display of a rendered frame on display 150.

Collision Detection Simulation Module

In accordance with some aspects of present specification, the collision detection simulation module 132 implements a plurality of instructions or programmatic code to define and generate, during run-time, a virtual composite model representative of a player controlled avatar or virtual character. While the embodiments of the present specification have been described with reference to a player controlled avatar or virtual character, it should be appreciated that this is in no way limiting and that the systems and method of the present specification may be equally implemented for a player controlled virtual object.

Figure 2:
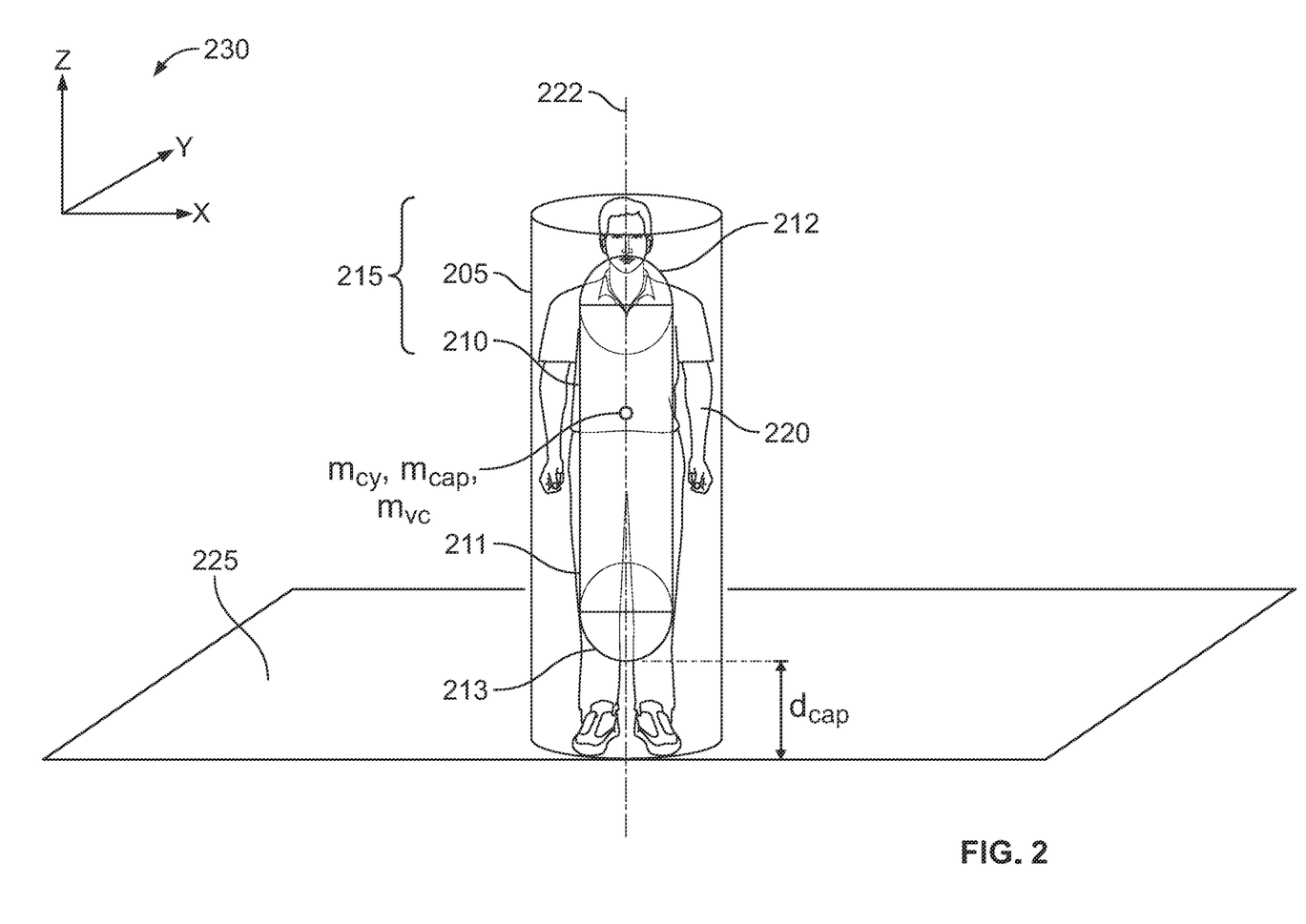
FIG. 2 illustrates cylinder and capsule models with reference to an avatar or virtual character, in accordance with an embodiment of the present specification.

As shown in FIG. 2, the composite model 215 comprises a first geometric primitive or model 205 having a first shape and size and a second geometric primitive or model 210 having a second shape and size. In embodiments, the second geometric primitive or model 210 is bounded by and encompassed by, or positioned within, the first geometric primitive or model 205.

The avatar or virtual character 220 is shown standing upright, for example, on a ground 225 (assuming that the ground level 225 is already known) such that a central longitudinal axis 222 of the avatar or virtual character 220 is parallel to the z-axis of a world coordinate system 230 while the ground 225 is parallel to the x-y plane defined in the world coordinate system 230.

In some embodiments, the first geometric primitive or model 205 is a cylinder that at least partially bounds and approximately represents the avatar or virtual character 220. In embodiments, the first size of the cylinder 205 is defined by the following parameters: a) a center line $l_{cy}$ (containing the center of mass of the cylinder $m_{cy}$) and b) a radius $r_{cy}$ such that the center line $l_{cy}$ is coaxial with the central longitudinal axis 222 of the avatar or virtual character 220. In some embodiments, the first size (in terms of the center line $l_{cy}$ and the radius $r_{cy}$) of the cylinder 205 is defined such that the cylinder 205 bounds at least a portion of the avatar or virtual character 220. In an embodiment, the first size (in terms of the center line $l_{cy}$ and the radius $r_{cy}$) of the cylinder 205 is defined such that the cylinder 205 bounds an entirety of the avatar or virtual character 220.

In some embodiments, the second geometric primitive or model 210 is a capsule (also known as a sphero-cylinder) having a cylindrical body 211 with semi-spherical/hemi-spherical first and second ends or caps 212, 213. In embodiments, the second size of the capsule 210 is defined by the following parameters: a) a center line $l_{cap}$ (containing the center of mass of the capsule $m_{cap}$) and b) a radius $r_{cap}$ such that the center line $l_{cap}$ is coaxial with the central longitudinal axis 222 of the avatar or virtual character 220.

In some embodiments, $l_{cy} > l_{cap}$ and $r_{cy} > r_{cap}$ meaning that the first size of the cylinder 205 is larger than the second size of the capsule 210 so that the capsule 210 is bounded or encompassed within the larger cylinder 205. That is, the second size (in terms of the center line $l_{cap}$ and the radius $r_{cap}$) of the capsule 210 is defined such that the capsule 210 is bounded or encompassed by the cylinder 205. In some embodiments, the second size (in terms of the center line $l_{cap}$ and the radius $r_{cap}$) of the capsule 210 is further defined such that the capsule 210 bounds at least a portion of the avatar or virtual character 220.

As shown in FIG. 2, in some embodiments, the second size (in terms of the center line $l_{cap}$ and the radius $r_{cap}$) of the capsule 210 is defined such that a bottom end of the cap 213 of the capsule 210 (the cap 213 being the one that is closer to the ground 225 compared to the cap 212) lays a predefined distance '$d_{cap}$' above the ground 225.

As shown in FIG. 2, in some embodiments, the cylinder 205 and capsule 210 models are positioned such that the respective center of masses $m_{cy}$, $m_{cap}$ of the cylinder 205 and the capsule 210 coincide with the center of mass $m_{vc}$ of the avatar or the virtual character 220.

Sweep Tests

In accordance with some aspects of the present specification, the collision detection simulation module 132 is configured to perform run-time processing of player input (associated with manipulation of the avatar or virtual character) and collision detection based simulation to enable rendering of the frames of the virtual game space or environment.

Vertical Sweep Test

Figure 3A:
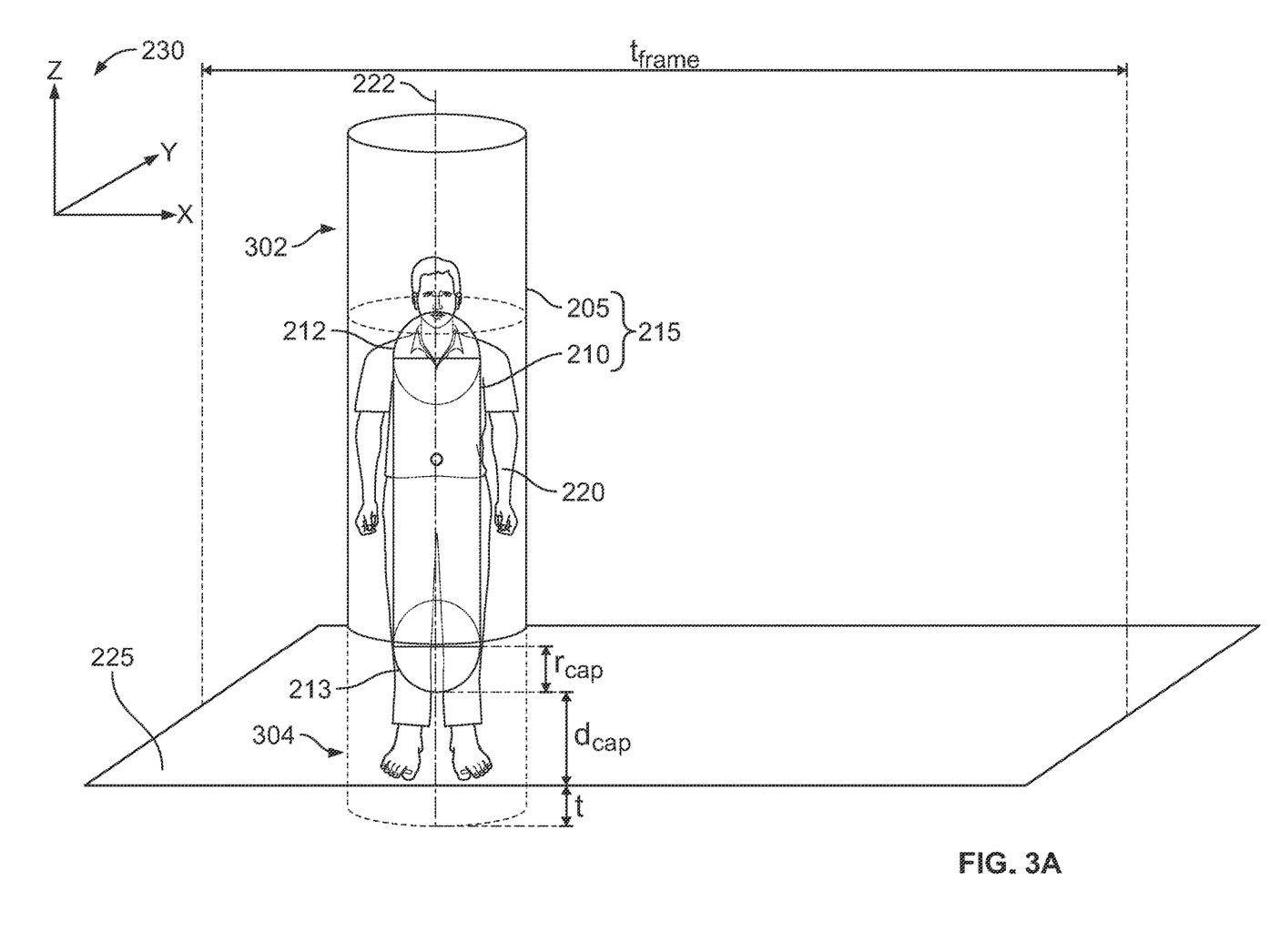
FIG. 3A illustrates a vertical sweep test being performed using a cylinder model, in accordance with some embodiments of the present specification.

In accordance with some aspects of the present specification, at run-time at the beginning of a frame (having a frame duration $t_{frame}$), the collision detection simulation module 132 is configured to perform a vertical sweep test using the first geometric primitive or model 205—that is the cylinder 205. In some embodiments, the first geometric primitive or model 205 is swept vertically downwards to identify a ground obstacle, a ground level and/or a sloping ground/surface. As shown in FIG. 3A, the cylinder model 205 is swept or translated from a first position 302 vertically downwards to a second position 304 by an extent or a distance 'E'. In some embodiments, the extent or distance 'E' is a sum of the radius $r_{cap}$ of the second geometric primitive or model 210 (that is, the capsule 210), the distance '$d_{cap}$' of the cap 213 above the ground 225 and a predefined distance 't'. In various embodiments, the predefined distance T is customizable by a computer graphics designer. It should be appreciated that the distance 't' ensures that using the vertical sweep test the first geometric primitive or model 205 finds the ground 225 in every frame. In scenarios where the avatar or virtual character 220 is standing on the ground 225 (or slightly above the ground 225), at least some portion of the distance T may extend below the ground 225. However, when the avatar or virtual character 220 is jumping, for example, then the distance T would lie above the ground 225.

In some embodiments, the vertical sweep test is performed automatically by the module 132 and is not necessarily triggered by a prior collision determination. In some embodiments, the vertical sweep test is performed independent of a player's inputs related to the avatar or virtual character 220. In other words, the vertical sweep test, for each frame, is performed irrespective of whether the player does or does not manipulate the avatar or virtual character 220.

In some embodiments, determination of a ground level or a sloping ground/surface, using the first geometric primitive or model 205 for a downward vertical sweep test, amounts to determining an intersection between a cylinder representative of the avatar or virtual character 220 and a plane representative of a horizontal ground level or a sloping ground/surface. Thus, in order to determine ground level or a sloping surface, the downward vertical sweep test determines an intersection of the cylinder model 205 with the ground 225 (which may or may not have a slope) represented by a plane.

In some embodiments, in order to determine collision with a ground obstacle the module 132 is configured to a) determine a first image obtained by projecting the cylinder model 205, in the second position 304, onto the z-axis of the world coordinate system 230, b) determine a second image obtained by projecting the ground obstacle onto the z-axis of the world coordinate system 230, b) determine if a first condition is fulfilled, wherein the first condition is indicative of an overlap or intersection between the first and second image projections, c) determine a third image obtained by projecting the cylinder model 205, in the second position 304, onto the xy plane of the world coordinate system 230, d) determine a fourth image obtained by projecting the ground obstacle onto the xy plane, and e) determine if a second condition is fulfilled, wherein the second condition is indicative of an overlap or intersection between the third and fourth image projections. In some embodiments, if both the first and second conditions are fulfilled, the module 132 concludes that there exists a potential collision of the avatar or virtual character 220 with the ground obstacle.

In some embodiments, the ground obstacle may be represented by a geometric primitive or model of a shape such as, but not limited to, a cylinder, a sphere, a capsule, a rectangle, a pyramid or a polyhedron. In some embodiments, the ground obstacle may be represented by a mesh of geometric primitives. Thus, in embodiments, the cylinder model 205 is used to perform a downward vertical sweep test against both shape-based and mesh-based world collision geometry.

After performing the downward vertical sweep, the model 132 is configured to move or translate the cylinder model 205 from the second position 304 back to the first position 302 prior to performing a horizontal sweep test using the capsule model 210.

It should be appreciated that the capsule model 210 does not participate in the vertical sweep test, in accordance with some embodiments of the present specification.

Horizontal Sweep Test

Figure 3B:
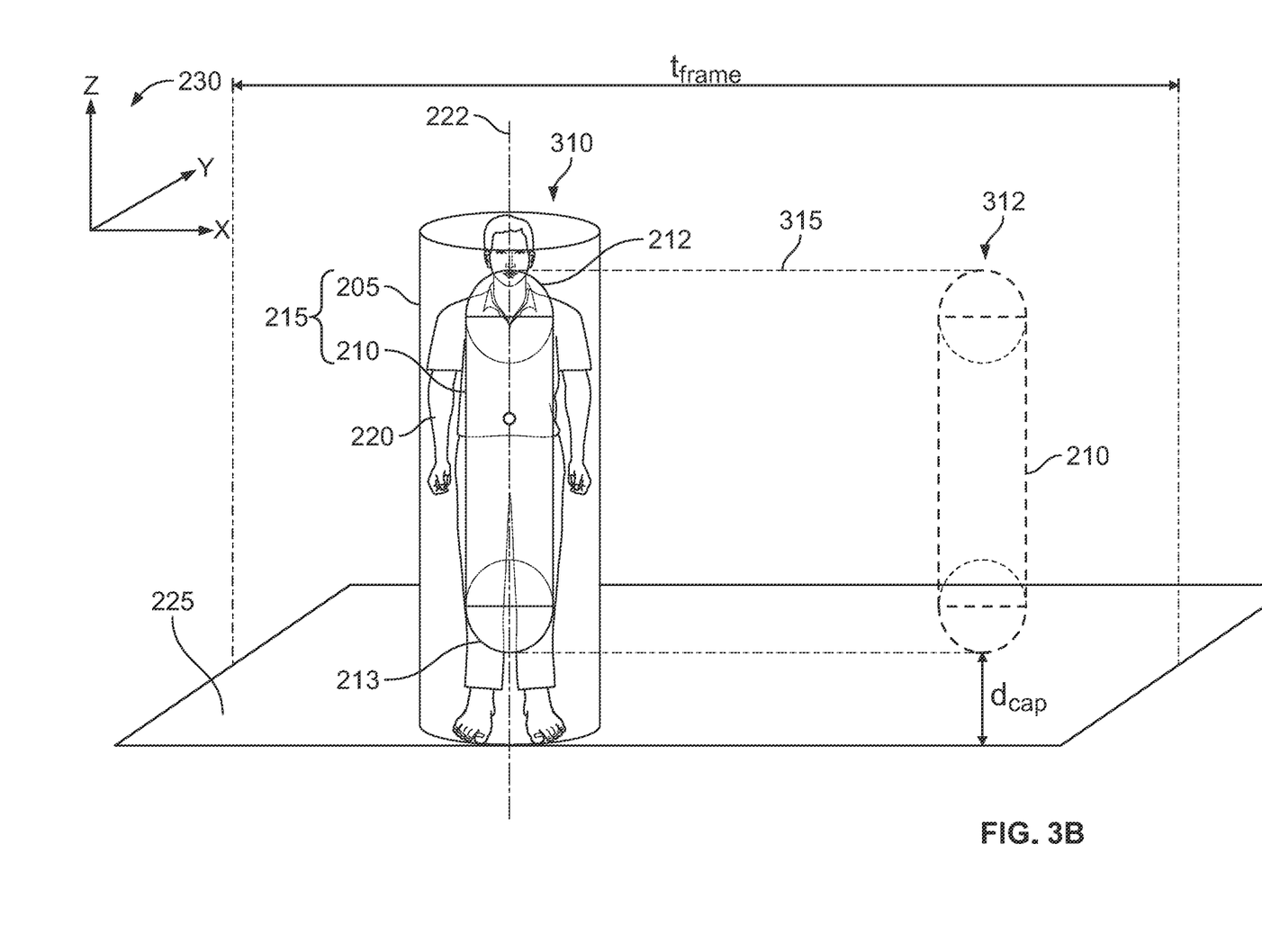
FIG. 3B illustrates a horizontal sweep test being performed using a capsule model, in accordance with some embodiments of the present specification.

In accordance with some aspects of the present specification, at run-time at the beginning of the frame (having the frame duration $t_{frame}$), the collision detection simulation module 132 is configured to perform a horizontal sweep test using the second geometric primitive or model 210—that is the capsule model 210 in order to determine potential collision or contact of the model 210 with an obstacle positioned on the ground 225. It should be appreciated that a level of the ground 225 is already determined using the cylinder model 205 in the vertical sweep test.

As shown in FIG. 3B, during run-time at the beginning of the frame, the module 132 receives player input (such as, for example, related to manipulation of the player controlled avatar or virtual character 220) and determines or simulates the movement of the avatar or virtual character 220 from a first position 310 to a second position 312 in the frame (having the frame duration $t_{frame}$).

In some embodiments, where the ground obstacle is stationary, the module 132 uses the direction and velocity imparted to the virtual character 220 at the first position 310, as a result of the player input, in order to determine the second position 312 by predicting a path or trajectory that the virtual character 220 would likely traverse in order to move from the first position 310 to the second position 312.

In some embodiments, where the ground obstacle is moving, the module 132 uses the direction and 'relative' velocity imparted to the virtual character 220 at the first position 310, as a result of the player input, with reference to the ground obstacle in order to determine the second position 312 by predicting a path or trajectory that the virtual character 220 would likely traverse in order to move from the first position 310 to the second position 312.

In some embodiments, the module 132 is configured to simulate a forward horizontal sweep of the capsule model 210 from the first position 310 to the determined second position 312 along the predicted path or trajectory. The simulation results in a volume 315 (also referred to as 'swept volume') virtually swept by the capsule model 210 from the first position 310 to the second position 312.

In some embodiments, determination of collision with the ground obstacle, using the capsule model 210 for a forward horizontal sweep test, amounts to determining presence of the ground obstacle within the virtual volume 315 swept by the capsule model 210. That is, if the ground obstacle is determined to be present within the swept volume 315, the module 132 concludes a potential collision between the avatar or virtual character 220 and the ground obstacle. In some embodiments, the module 132 performs collision simulation for only those ground obstacles that lie within the virtual environment or game space occupied by the swept volume 315.

In some embodiments, the module 132 determines if the capsule model 210 and the ground object are likely to collide by a) determining if a first condition is fulfilled, wherein the first condition is indicative of whether a first image obtained by projecting the swept volume 315 onto the xy plane of the world coordinate system 230 and a second image obtained by projecting an outer contact surface of the ground object onto the xy plane overlap or contact, and b) determining if a second condition is fulfilled, wherein the second condition is indicative of whether a third image obtained by projecting the swept volume 315 onto the z axis of the world coordinate system 230 and a fourth image obtained by projecting the outer contact surface of the ground object onto the z axis overlap or contact. If both the first and second conditions are fulfilled, the module 132 concludes that the avatar or virtual character will collide or contact the ground obstacle while traversing from the first position 310 to the second position 312.

In some embodiments, the outer contact surface of the ground obstacle may be represented by a collision mesh in the exact shape of the ground obstacle or by a 3 dimensional shape overlaying or bounding the ground obstacle such as, but not limited to, a cylinder, a sphere, a capsule, a rectangle, a pyramid or a polyhedron. Thus, the first condition is determined by the module 132 based on a two-dimensional calculation using the x and y coordinates of the capsule model 210 and a collision mesh or a 3 dimensional bounding shape or volume of the ground obstacle. Also, the second condition is determined by the module 132 based on a one-dimensional calculation using the z coordinates of the capsule model 210 and a collision mesh or a 3 dimensional bounding shape or volume of the ground obstacle.

It should be appreciated that since the capsule model 210 is positioned at the distance '$d_{cap}$' of the cap 213 above the ground 225, the module 132 detects collision of the avatar or virtual character 220 with only those ground obstacles that have a height (or a vertical dimension along a direction parallel to the z axis) greater than the distance '$d_{cap}$'. This enables the player controlled avatar or virtual character to move over small ground obstacles (having heights less than or equal to the distance '$d_{cap}$') on the ground 225 without requiring frequent halts or changes in the speed and/or direction of motion that would otherwise result from collision detection with the small obstacles.

Figure 4:
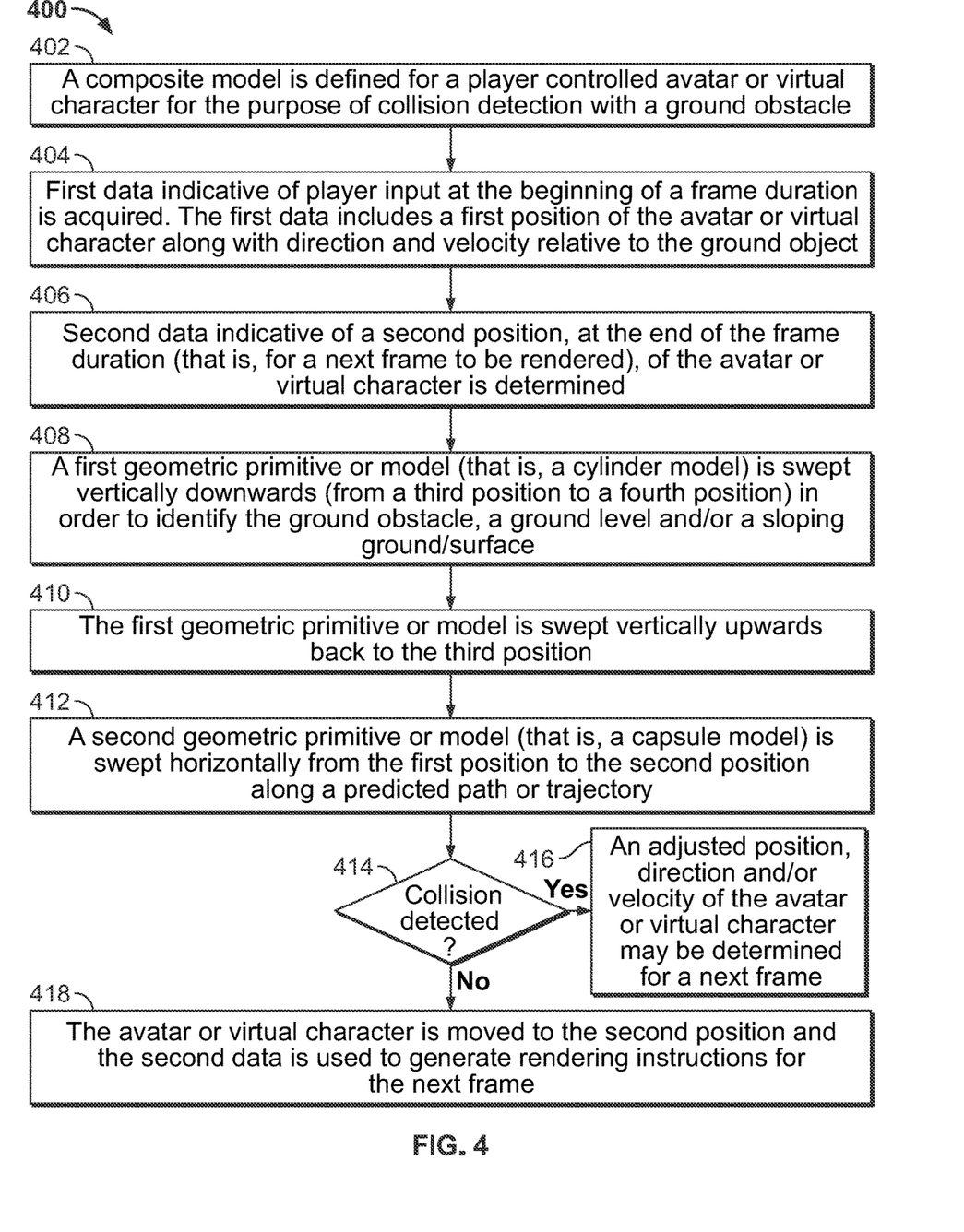
FIG. 4 is a flowchart of a plurality of exemplary steps of a method of predicting collision detection, in accordance with some embodiments of the present specification.

FIG. 4 is a flowchart of a plurality of exemplary steps of a method 400 of predicting collision detection, in accordance with some embodiments of the present specification. The method 400 is executed by the module 132 (FIG. 1A) during run-time to simulate frames of a virtual environment or game space based on player input. In embodiments, the method 400 is executed on a frame-by-frame basis for consecutive rendering of frames of the virtual environment or game space.

Referring now to FIGS. 1 and 4, at step 402, a composite model is virtually defined for a player controlled avatar or virtual character for the purpose of collision detection with a ground obstacle. In some embodiments, the avatar or virtual character is oriented vertically on a ground such that a central longitudinal axis of the avatar or virtual character is parallel to a z axis of a world coordinate system. In some embodiments, the composite model comprises a first geometric primitive or model having a first shape and size and a second geometric primitive or model having a second shape and size. In embodiments, the second geometric primitive or model is bounded by and positioned within the first geometric primitive or model.

In some embodiments, the first geometric primitive or model is a cylinder model that at least partially bounds and approximately represents the avatar or virtual character. The cylinder model is characterized by a center line $l_{cy}$ (containing the center of mass of the cylinder $m_{cy}$) and a radius $r_{cy}$ such that the center line $l_{cy}$ is coaxial with the central longitudinal axis of the avatar or virtual character. In an embodiment, the first size (in terms of the center line $l_{cy}$ and the radius $r_{cy}$) of the cylinder model is defined such that the cylinder model bounds an entirety of the avatar or virtual character.

In some embodiments, the second geometric primitive or model is a capsule model having a cylindrical body with semi-spherical/hemispherical first and second ends or caps (also referred to as top and bottom ends or caps). The capsule model is characterized by a center line $l_{cap}$ (containing the center of mass of the capsule $m_{cap}$) and a radius $r_{cap}$ such that the center line $l_{cap}$ is coaxial with the central longitudinal axis of the avatar or virtual character. The capsule model has first and second end caps (hemispherical) of radii $r_{cap}$.

In some embodiments, the second size (in terms of the center line $l_{cap}$ and the radius $r_{cap}$) and positioning of the capsule model is defined such that a) the capsule model is bounded or encompassed by the cylinder model, b) the capsule model bounds at least a portion of the avatar or virtual character, and c) a tip of the second cap (that lies closer to the ground compared to the first cap) lies a predefined height or distance '$d_{cap}$' above the ground.

At step 404, first data indicative of player input is acquired or detected at the beginning of a frame duration $t_{frame}$ (that is, at the beginning of a current frame). In some embodiments, the first data includes a first position (or a current position/location) of the avatar or virtual character along with first direction and first velocity, relative to the ground object, imparted to the avatar or virtual character as a result of the player's manipulation of the avatar or virtual character.

In some embodiments, periodic polling of the one or more client devices 110 is performed to acquire the first data. In some embodiments, the periodic polling is performed at a predetermined polling rate. In some embodiments, the polling rate is equal to the frame rate $R_{frame}$—that is, the rate at which frames are rendered for display on the one or more client devices 110. That is, the collision check is performed at display intervals of the game space frames. If the frame rate is $R_{frame}$ then the frame duration $t_{frame}=1/R_{frame}$. For example, if the frame rate is 60 fps (frames per second) then the frame duration $t_{frame}=1/60$ seconds=polling period or duration. In alternate embodiments, however, the polling rate may be set higher than the frame rate.

In some embodiments, an outer contact surface of the ground obstacle may be represented by a collision mesh in an exact shape of the ground obstacle or by a 3 dimensional geometric shape overlaying or bounding the ground obstacle such as, but not limited to, a cylinder, a sphere, a capsule, a rectangle, a pyramid or a polyhedron.

At step 406, second data indicative of at least a second position (or a predicted position/location), at the end of the frame duration $t_{frame}$ (that is, for a next frame to be rendered), of the avatar or virtual character is determined or predicted. In some embodiments, the second position is determined by predicting a path or trajectory that the avatar or virtual character would likely traverse, from the first position to the second position, based on the first direction and first velocity data derived from the player input.

At step 408, the first geometric primitive or model (that is, the cylinder model) is swept vertically downwards in order to identify the ground obstacle, and/or a ground level or surface that may be horizontal or sloping (with reference to an xy plane of the world coordinate system). In some embodiments, the first geometric primitive or model is swept vertically downwards, from an initial third position to a fourth position, by an extent or a distance 'E'. In some embodiments, the extent or distance 'E' is a sum of the radius $r_{cap}$ of the second geometric primitive or model (that is, the capsule model), the height or distance '$d_{cap}$' of the second cap above the ground and a predefined distance 't'. In various embodiments, the predefined distance 't' is customizable by a computer graphics designer.

At step 410, the first geometric primitive or model is swept vertically upwards back to the third position.

At step 412, the second geometric primitive or model (that is, the capsule model) is swept forward horizontally from the first position to the second position along the predicted path or trajectory in order to determine if the avatar or virtual character is likely to collide or contact the ground obstacle.

It should be appreciated that since the second geometric primitive or model is positioned at the distance '$d_{cap}$' of the second cap (or the bottom cap) above the ground (the level of which has already been identified at step 408 using a vertical sweep test), the module 132 detects collision of the avatar or virtual character with the ground obstacle only if a height (or a vertical dimension along a direction parallel to the z axis) of the ground obstacle is greater than the distance '$d_{cap}$'.

At step 414, a determination is made, based on the vertical and horizontal sweep tests of steps 408 and 412, as to whether a collision is detected. If a collision is detected then, at step 416, an adjusted position, direction and/or velocity of the avatar or virtual character may be determined for a next frame. However, if no collision is detected then, at step 418, the avatar or virtual character is moved to the second position and the second data is used to generate rendering instructions for the next frame.

It should be appreciated that, in alternate embodiments, the order of the steps of the method 400 may be modified.

For example, in some embodiments, the step 404 may be performed prior to the step 402.

The above examples are merely illustrative of the many applications of the system of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

I claim:

1. A method of detecting a collision between a player controlled virtual character and an object positioned in a virtual environment of a video game, the method being implemented by at least one server executing a plurality of programmatic instructions and comprising:
    defining a first geometric model and a second geometric model, wherein the first geometric model has a first shape and first size, wherein the second geometric model has a second shape and second size, wherein each of the first geometric model and the second geometric model at least partially bound the virtual character, and wherein the first geometric model fully encompasses the second geometric model;
    acquiring, for a first frame of the video game, first data indicative of player input associated with a movement of the virtual character, wherein the first data includes a first position, a first velocity and a first direction of the virtual character and wherein the first velocity is relative to the object;
    determining, for a second frame of the video game, second data indicative of a second position of the virtual character, wherein the second position is different from the first position;
    moving, the first geometric model, vertically downward from a third position to a fourth position by a predefined first distance in order to identify a level of a ground surface in the virtual environment; and
    moving, the second geometric model, horizontally forward from the first position to the second position in order to detect the collision of the virtual character with the object.

2. The method of claim 1, wherein the first shape is that of a cylinder and the first size is characterized by a first center line containing a center of mass of the cylinder and a first radius, and wherein the second shape is that of a capsule and the second size is characterized by a second center line containing a center of mass of the capsule and a second radius.

3. The method of claim 1, wherein the second position is determined by predicting a path of the virtual character from the first position to the second position based on the first direction and first velocity.

4. The method of claim 1, wherein the predefined first distance is a sum of a radius of the second geometric model, a height of a cap of the second geometric model above the ground surface and a customizable second distance.

5. The method of claim 1, wherein the second geometric model is moved such that a bottom cap of the second geometric model remains at a predefined height above the ground surface.

6. The method of claim 1, wherein the level is horizontal or sloping.

7. The method of claim 1, wherein the horizontal forward movement of the second geometric model detects collision with the object if the object has a height greater than a predefined height above the ground surface.

8. The method of claim 1, further comprising determining an adjusted position, direction and/or velocity of the virtual character if a collision is detected.

9. The method of claim 1, further comprising moving the virtual character to the second position if no collision is detected.

10. The method of claim 1, wherein the collision detection is performed periodically at a rate equal to a frame rate of display of the virtual environment.

11. A computer readable non-transitory medium comprising a plurality of executable programmatic instructions wherein, when said plurality of executable programmatic instructions are executed by a processor in a computing device, a process for detecting collision between a player controlled virtual character and an object positioned on a ground in a virtual environment is performed, the plurality of executable programmatic instructions being implemented by at least one server and comprising:
    defining first and second geometric models, wherein the first geometric model has a first shape and first size while the second geometric model has a second shape and second size, wherein the first and second geometric models at least partially bound the virtual character, and wherein the first geometric model fully bounds the second geometric model;
    acquiring, for a frame, first data indicative of player input associated with manipulation of the virtual character, wherein the first data includes a first position, first velocity and first direction of the virtual character, and wherein the first velocity is relative to the object;
    determining, for a next frame, second data indicative of a second position of the virtual character;
    moving, the first geometric model, vertically downward from a third position to a fourth position by a predefined first distance in order to identify a level of the ground; and
    moving, the second geometric model, horizontally forward from the first position to the second position in order to detect collision of the virtual character with the object.

12. The computer readable non-transitory medium of claim 11, wherein the first shape is that of a cylinder and the first size is characterized by a first center line containing a center of mass of the cylinder and a first radius, and wherein the second shape is that of a capsule and the second size is characterized by a second center line containing a center of mass of the capsule and a second radius.

13. The computer readable non-transitory medium of claim 11, wherein the second position is determined by predicting a path of the virtual character from the first position to the second position based on the first direction and first velocity.

14. The computer readable non-transitory medium of claim 11, wherein the predefined first distance is a sum of a radius of the second geometric model, a height of a cap of the second geometric model above the ground and a customizable second distance.

15. The computer readable non-transitory medium of claim 11, wherein the second geometric model is moved such that a bottom cap of the second geometric model remains at a predefined height above the ground.

16. The computer readable non-transitory medium of claim 11, wherein the level is horizontal or sloping.

17. The computer readable non-transitory medium of claim 11, wherein the horizontal forward movement of the second geometric model detects collision with the object if the object has a height greater than a predefined height above the ground.

18. The computer readable non-transitory medium of claim 11, further comprising: determining an adjusted position, direction and/or velocity of the virtual character if a collision is detected.

19. The computer readable non-transitory medium of claim 11, further comprising: moving the virtual character to the second position if no collision is detected.

20. The computer readable non-transitory medium of claim 11, wherein the collision detection is performed periodically at a rate equal to a frame rate of display of the virtual environment.

* * * * *